Nov. 10, 1964 | J. C. SMELTZER | 3,156,815

REGISTER MONITOR

Filed Jan. 3, 1961 | 3 Sheets-Sheet 1

| | Digit Time | Bit Position<br>Xw 7 | 6 | 5 | 4 | 3 | 2 | Xr 1 |
|---|---|---|---|---|---|---|---|---|
| Word Time 1 | 1 | 1 | | | | | | |
| | 2 | 0 | 1 | | | | | |
| | 3 | 1 | 0 | 1 | | | | |
| | 4 | 1 | 1 | 0 | 1 | | | |
| | 5 | 1 | 1 | 1 | 0 | 1 | | |
| | 6 | 0 | 1 | 1 | 1 | 0 | 1 | |
| | 7 | 1 | 0 | 1 | 1 | 1 | 0 | 1 |
| Word Time 2 | 1 | 1 | 1 | 0 | 1 | 1 | 1 | 0 |
| | 2 | 0 | 1 | 1 | 0 | 1 | 1 | 1 |
| | 3 | 1 | 0 | 1 | 1 | 0 | 1 | 1 |
| | 4 | 1 | 1 | 0 | 1 | 1 | 0 | 1 |
| | 5 | 1 | 1 | 1 | 0 | 1 | 1 | 0 |
| | 6 | 0 | 1 | 1 | 1 | 0 | 1 | 1 |
| | 7 | 1 | 0 | 1 | 1 | 1 | 0 | 1 |
| Word Time 3 | 1 | 1 | 1 | 0 | 1 | 1 | 1 | 0 |

| | Digit Time | Bit Position<br>Xw 7 | 6 | 5 | 4 | 3 | 2 | Xr 1 |
|---|---|---|---|---|---|---|---|---|
| Word Time 1 | 1 | 1 | | | | | | |
| | 2 | 0 | 1 | | | | | |
| | 3 | 0 | 0 | 1 | | | | |
| | 4 | 0 | 0 | 0 | 1 | | | |
| | 5 | 0 | 0 | 0 | 0 | 1 | | |
| | 6 | 0 | 0 | 0 | 0 | 0 | 1 | |
| | 7 | 0 | 0 | 0 | 0 | 0 | 0 | 1 |
| Word Time 2 | 1 | 1 | 0 | 0 | 0 | 0 | 0 | 0 |
| | 2 | 0 | 1 | 0 | 0 | 0 | 0 | 0 |
| | 3 | 0 | 0 | 1 | 0 | 0 | 0 | 0 |
| | 4 | 0 | 0 | 0 | 1 | 0 | 0 | 0 |
| | 5 | 0 | 0 | 0 | 0 | 1 | 0 | 0 |
| | 6 | 0 | 0 | 0 | 0 | 0 | 1 | 0 |
| | 7 | 0 | 0 | 0 | 0 | 0 | 0 | 1 |

JACK C. SMELTZER
INVENTOR.

BY John L Jackson

ATTORNEY

JACK C. SMELTZER
INVENTOR.

BY John L Jackson

ATTORNEY

JACK C. SMELTZER
INVENTOR.
BY John L. Jackson
ATTORNEY

United States Patent Office 3,156,815

Patented Nov. 10, 1964

3,156,815

REGISTER MONITOR

Jack C. Smeltzer, Woodland Hills, Calif., assignor, by mesne assignments, to The Bunker-Ramo Corporation, Canoga Park, Calif., a corporation of Delaware Filed Jan. 3, 1961, Ser. No. 80,326

2 Claims. (Cl. 235—164)

This invention relates to circulating registers used in digital computers in general and more particularly to a method and means for monitoring the information contained therein.

Many different types of circulating registers are currently used in digital computers. A register may, for instance, be of the flip-flop shift register type, the magnetic core type, the drum or disc type wherein the magnetic storage medium is utilized to effect a delay, the capacitive type wherein capacitive charges represent bit contents, or the magnetostrictive delay line type. In all of the above-mentioned types of circulating registers the contents are caused to step along in the register from bit position to bit position in accordance with the particular computer timing employed.

Many times a computer operator or programmer will have need of a visual indication of the contents of a circulating register in a computer as it steps one instruction at a time through the program. Static display devices, such as neon lamps, are not directly applicable since the information to be displayed is in serial form and thus the contents of the output or read portion of the register change continuously with time. Hence, to effectively monitor the contents of a circulating register, some device which will provide a timewise identification of the information contained in the register must by necessity be provided.

Various methods and devices have been utilized in the past to enable an operator to monitor the contents of registers in computers. Of the many methods practiced in the past, only one method has proved satisfactory. This method is the utilization of a small console mounted oscilloscope to display the contents of the register being monitored. The sweep time of the scope is made equal to the register circulation time and sometimes, in this method, intensity modulation is employed at clock times to delineate the bit content of the particular bit positions of the register.

The monitoring of a circulating register through the utilization of an oscilloscope has several disadvantages attendant thereto. One such disadvantage is that the oscilloscope is quite expensive since relatively high cost power supplies are needed for its operation. In addition, the information displayed by an oscilloscope is presented in the form of a waveshape graph which is not in an optimum form from an operator's point of view. For instance, a "go" or "no go" light indication such as is provided by a neon bulb facilitates a much more rapid digest and interpretation of the contents of a register which is being monitored. Another disadvantage attendant to scope-type register monitors is that frequent adjustments of the scope generally must be made in order that a correct indication of the contents of the register is assured. Ideally then, a "go" or "no go" light source indication, which can be set once and then virtually forgotten as far as adjustment is concerned, is best suited from the standpoint of high reliability with a minimum amount of requisite corrective maintenance.

It is, therefore, an object of the present invention to provide a novel device which will accurately display the contents of a circulating register.

Another object of the present invention is to provide a novel method for accurately monitoring the contents of a circulating register.

Another object of the present invention is to provide a register monitor for monitoring the contents of a circulating register which is relatively inexpensive and compact.

Another object of the present invention is to provide a novel method and device for monitoring the contents of a circulating register which facilitates a rapid digest and interpretation of the contents of the register.

Other and further objects and advantages of the present invention will become apparent to one skilled in the art from a consideration of the following detailed description when read in light of the accompanying drawings, in which.

Briefly, the device utilizes a control register which is capable of parallel output to circulate a strobe bit. This strobe bit is gated timewise with the serial output of the displayed register, the various gates passing a signal only if a one-bit is contained in the output portion of the displayed register during the particular digit time involved. The outputs of the various gates are amplified and stretched and used to drive associated neon indicators.

Figures 1, 2, 3:
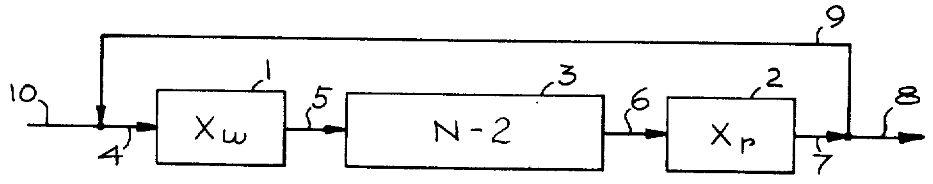
FIG. 1 is a simplified block representation of a typical circulating register the binary content of which the system of the present invention is to display.
FIG. 2 is a chart illustrating the entering and circulation of a computer word in the circulating register of FIG. 1.
FIG. 3 is a chart illustrating the entering and circulation of a strobe bit in the control register utilized in the present invention.

For a more detailed description, refer first to FIG. 1, which is a simplified block representation of a circulating register. The block 1 labelled "$X_w$" represents the means of writing into the register. As was mentioned previously, the actual make-up of $X_w$ depends upon the particular type of circulating register used. For instance, $X_w$ might be the input flip-flop of a flip-flop register or it might be the write amplifier of a register employing a magnetic medium as a delay line. The block 2 labelled "$X_r$" represents the means by which information is read from the circulating register. Again, the actual make-up of $X_r$ depends upon the particular type of register being used. The entire register illustrated in FIG. 1 is $n$ bits in length. For purpose of explanation, assume that a one bit delay is encountered in both $X_w$ and $X_r$ and $n-2$ bits is held in block 3 labelled "N−2."

As is illustrated in FIG. 1, the flow of information within the register is as follows: The input to the circulating register is along input line 4 into $X_w$, thence from $X_w$ along line 5 into the main delay N−2. The information then passes from N−2 along line 6 into $X_r$, leaving $X_r$ along output line 7 where it may be either output to another portion of the computer along line 8 and is circulated along return line 9 to enter again along line 4 into $X_w$. As is illustrated in FIG. 1, the input to $X_w$ may be either from $X_r$ or along line 10 from some other source.

Refer next to FIG. 2, which is a chart illustrating timewise entry and circulation of a word in a circulating register. Some type of timing must be employed in a synchronous computer. In the present description, a computer word which is $n$ bits in length will be referred to as being $n$ digit times or one word time in length. Each bit of the computer word can thus be identified by a particular digit time. Thus, during a particular digit time, as illustrated by the chart in FIG. 2, a particular bit of information will be in a certain position in the circulating register. At the next digit time this bit of information will have shifted one bit position to the right within the circulating register. As is obvious from a consideration of the chart contained in FIG. 2, the length of a circulating register may be defined in digit times and the length of the register which is needed to circulate the sample word contained in the chart of FIG. 2 is 7 digit times. Considering FIG. 2, it may be seen that if a one bit is entered into bit position $X_w$ at DT1 of word time 1, it will be in BP6 at DT2; BP5 at DT3, etc. Likewise, if a zero is entered into $X_w$ at DT2, it will be in BP6 at DT3; BP5 at DT4; etc. In this manner a word may be serially entered into the register. As is shown, the word will be completely entered into the register at DT7. As is further illustrated, the word makes a complete circulation each word time or seven digit times. Thus, since the information in a circulating register is sequentially stepped through the register, the contents of the various bit positions at any given digit time is predictable.

As is obvious from the discussion immediately preceding, the contents of the register will appear sequentially in $X_r$ and may be read from it during the particular digit times involved. For instance, referring again to the chart contained in FIG. 2 and assuming that the contents of the register represent a number, the least significant digit of which is contained in $X_r$ at DT1. The most significant digit of the number will appear in $X_r$ at DT7.

FIG. 3 is a chart which illustrates the timewise entry and circulating of a strobe bit in the particular type of control circulating register which is utilized in the present invention. This control register employs the same timing as the displayed register and is capable of parallel output. As illustrated in FIG. 3, a single bit one is entered into $X_w$ at DT1 and zeros are entered during DTs2–7. The significance of this strobe bit will become more readily apparent from the hereinafter discussion.

In the following discussion the designation "gate" will signify "and" type gates. Likewise, the designation "gated" refers to the function of "and" gates. Reference to other types of gates or their functions will be made by specific name.

Figures 4, 5:
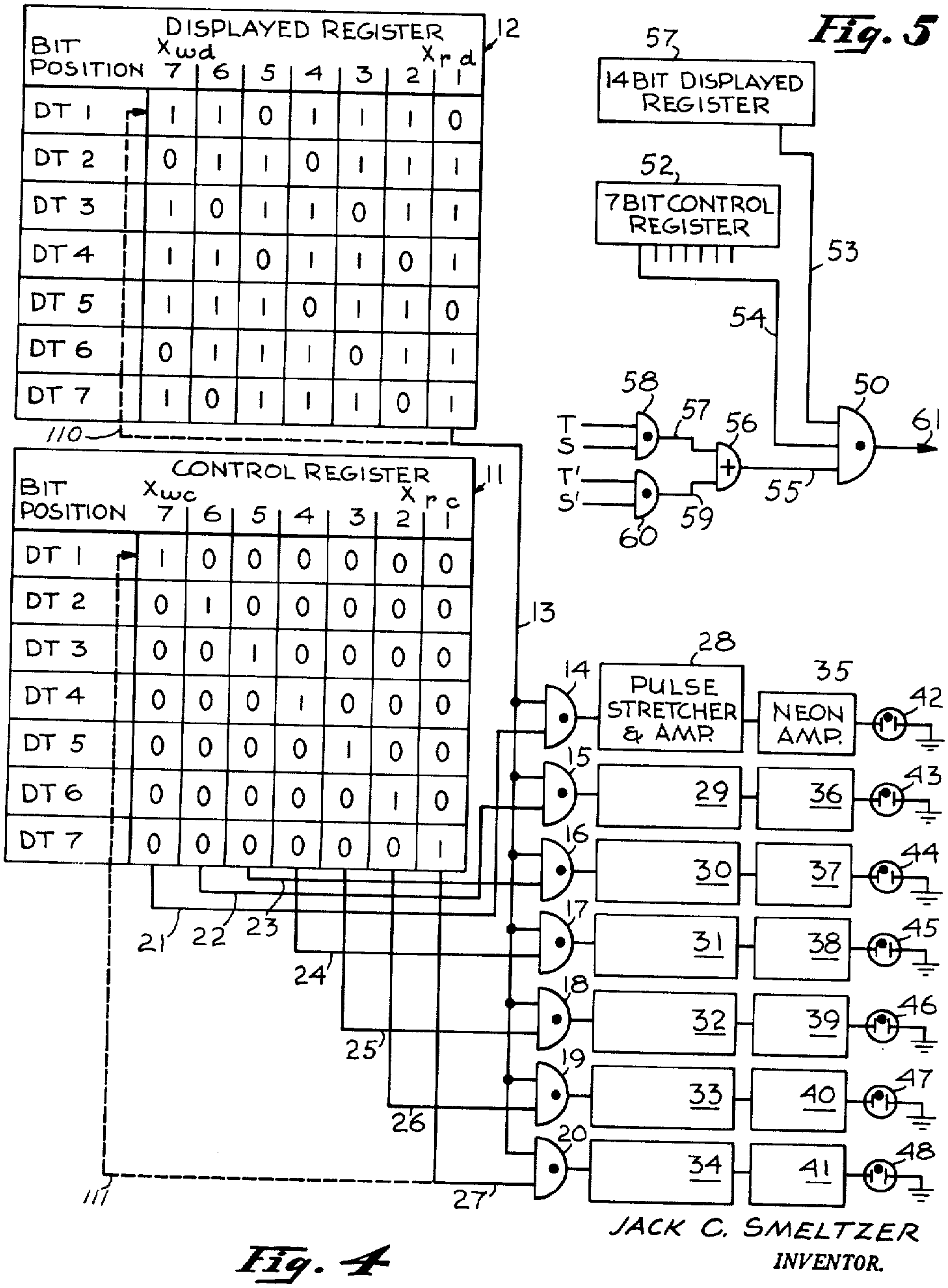
FIG. 4 is a chart-block diagram illustrating one embodiment of the novel method of gating the contents of the displayed register with the control register.
FIG. 5 is a block diagram illustrating another embodiment of the arrangement of FIG. 4 which is particularly adaptable in applications wherein computer control panel space is limited.

Refer next to FIG. 4 which illustrates, through means of a chart-block diagram, the utilization of the parallel output control register 11 to monitor the contents of the displayed register 12. Stage $X_{rd}$ which is the output stage of the displayed register 12 is connected to common line 13 which makes up one term of each of the seven two-term gates 14 through 20. The number of gates depends on the length of the control register 11 which, in this example, is 7 bits. Control register 11 is preferably the same length as displayed register 12 but, as is hereinafter explained, it may be a length which is a multiple or sub-multiple thereof.

As is obvious from a consideration of FIG. 4, the contents of displayed register 12 will appear sequentially during DTs1–7 on outut line 13. Since line 13 is common to each of the gates 14 through 20, one term of all the gates 14 through 20 will be true or false at a particular digit time in accordance with the contents of the displayed register 12.

The bit output of stage $X_{wc}$ of the parallel output control register 11 is fed along line 21 and thus makes up the other term of the two-term gate 14. The bit output of BP6 of the control register is fed along line 22 and thus makes up the other term of gate 15. In like manner the bit outputs of bit positions 5 through 1 are fed along lines 23 through 27 respectively to make up the second term of gates 16 through 20 respectively. The output of each of the gates 14 through 20 is fed into an associated pulse stretcher-amplifier 28 through 34 and thence into an associated neon amplifier 35 through 41. The outputs of neon amplifiers 35 through 41 are then fed into neon indicators 42 through 48 respectively.

The operation of the device is as hereinafter described. A strobe bit is input along line 49 into $X_{wc}$ of the control register 12 at DT1. Zeros are input along line 49 into $X_{wc}$ during DTs2–7. Thus the strobe bit is in BP6 at DT2; BP5 at DT3; BP4 at DT4; PB3 at DT5; BP2 at DT6 and BP1 at DT7.

From a consideration of FIG. 4, it is apparent that $X_{rd}$ of the displayed register 12 will be true during DTs2–4 and DTs6 and 7 as the binary word 1101110 appears sequentially therein during DTs1–7. Thus line 13 which is common to one term of each of the two-term gates 14 through 20 is true during DTs2–4 and DTs6 and 7. Refer next to the control register 11 of FIG. 4 which circulates a one or strobe bit during DTs1–7. The output of the control register 11, as previously stated, is in parallel. During DT1, the strobe one will be in BP7 of the control register 11 and thus line 21 which is the other input line of gate 14 will be true during DT1. Gate 14 will, however, be false in this example since line 13 is false during DT1. Thus the neon indicator 42 will not be energized. During DT2, the strobe one will be in BP6 of the control register 12 and thus line 22 which is the other input term of gate 15 will be true during DT2. Gate 15 will pass a signal during DT2 since line 13 is true in this particular example. The output of gate 15 (which is true for one digit time each word time) is stretched and amplified and used to drive the neon indicator 43. Thus, the various gates 14 through 20 will come true only if there is a one in $X_{rd}$ of the register to be displayed during the particular digit time involved. The one circulated in the control register 11 thus acts as a strobe bit in that it causes the various gates 14 through 20 to come true in the event that a one is contained in bit position of the displayed register 12 at the particular digit time involved. The design of the amplifier-pulse stretcher and neon amplifier means is not particularly critical and is not itself intended to be a part of the invention. The combination serves only to amplify the one pulse per word time received from its associated gate and integrate this pulse in a conventional RC circuit to yield a D.C. voltage which is amplified to drive its associated neon indicator. Many such combinations are known in the art which will satisfactorily provide the signal necessary to drive the neon indicator or other indicating means from the output of the gates 14 through 20.

As was previously indicated, one neon indicator is associated with each gate. As shown in the present embodiment, the presence of a bit in a particular bit position of the displayed register will cause the neon indicator associated therewith to light; however, the system may be arranged such that the presence of a zero in a particular bit of the register to be displayed would cause the particular neon indicator associated therewith to be lighted.

In the present description, a displayed register 12 and a control register 11 which are the same length have been described. It is not necessary, however, that they be the same length. It is desirable, however, that the displayed register 12 be either a multiple or submultiple of the control register 11 in order that synchronization of the two registers can be easily achieved. If the displayed register 12 is a length which is a multiple of the control register 11, some sort of timing means must be employed to enable selection of the portions of the displayed register which are to be displayed. For instance, refer next to FIG. 5 which shows one three-term gate 50, having inputs along line 53 from a displayed register 51, along line 54 from a control register 52 and along line 55 from a two-term "or" gate 56. The two-term "or" gate in turn has inputs along line 57 from a two-term gate 58 and along line 59 from a two-term gate 60. For purposes of explanation, it will be assumed that the control register 52 is seven bits in length while the displayed register 51 is fourteen bits in length. The word length in the present example is fourteen bits.

Only one three-term gate 50 is shown in FIG. 5. However, as is obvious from a consideration of the figure, the number of three-term gates actually used will equal the number of bits in the control register 52 which in this example is seven. The timewise gating of the displayed register 51 and the parallel output control register 52 is as previously described. The inputs to the two gates 58 and 60 are from a toggle switch (not shown) and from the computer timing means (not shown). The toggle switch will be in one of two positions, the input from one position indicated in FIG. 5 by S and the other position by S'. T indicates DTs1–7 of the computer word while T' indicates DTs8–14. Gate 58 will be true during DTs1–7 if the switch is in position S. Likewise gate 60 will be true during DTs8–14 if the switch is in position S'. The "or" gate 56 will be true if either gate 58 or gate 60 is true.

In operation, if the first one-half (DTs1–7) of the displayed register 51 is to be displayed, the switch will be moved to position S. Line 55 which is the output of the "or" gate 56 will then be true only during digit times 1 through 7. In this manner the three-term gates are set up to monitor, as heretofore described, the timewise contents of the bits 1 through 7 of the displayed register 51. In a like manner the three-term gates may be set up to monitor the timewise contents of bits 8 through 14 of the displayed register 51 by moving the switch to position S'.

An amplifier-pulse stretcher-neon amplifier combination is used as previously described to amplify and integrate the one pulse per word time received from the various true gates to provide a D.C. signal suitable for driving associated neon indicators.

As is obvious, the device of FIG. 5 is particularly suited for those applications in which computer control panel space, as is the usual case, is limited and the number of neon indicators to be mounted thereon must preferably be held to a minimum.

Figure 6:
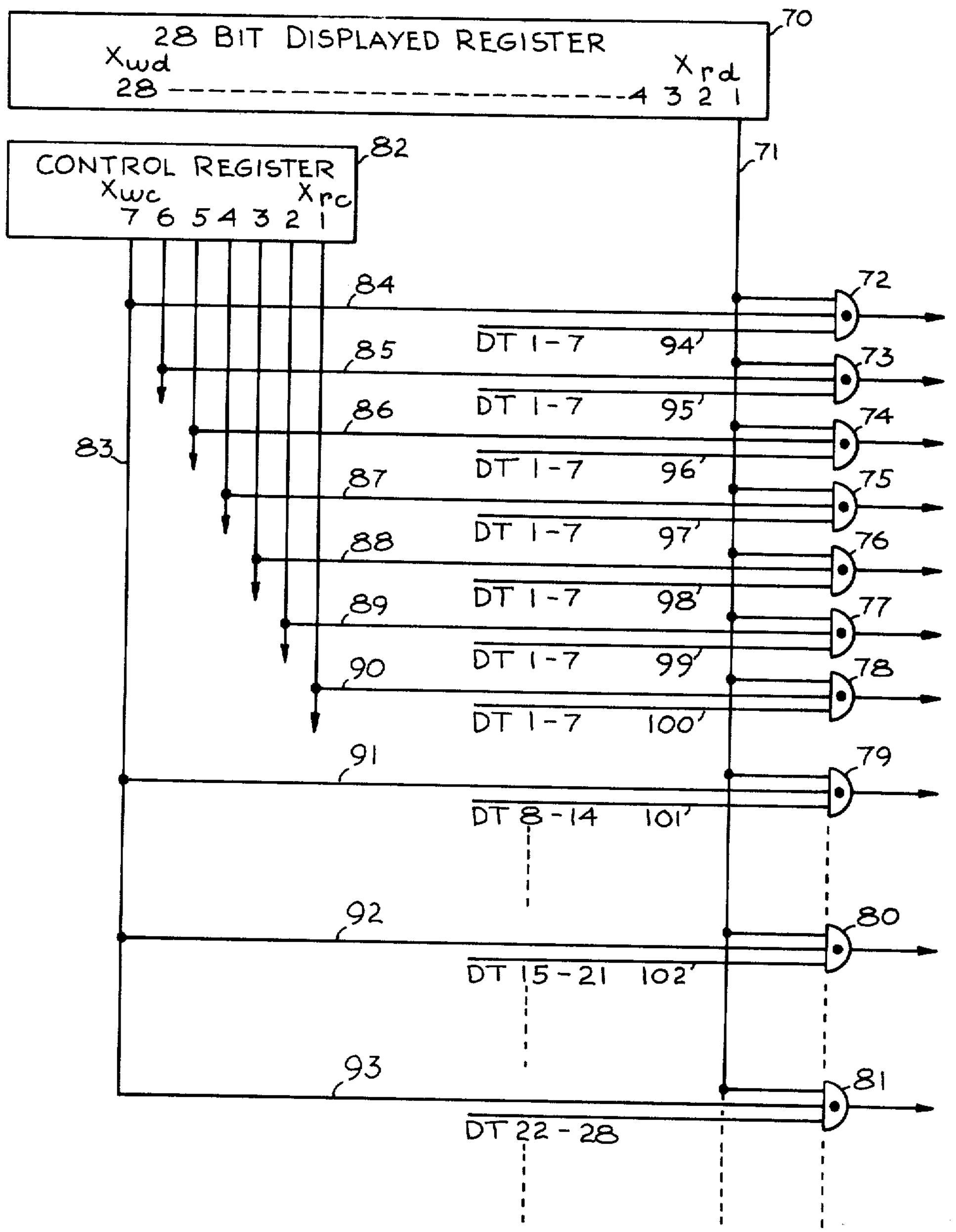
FIG. 6 is a block diagram illustrating still another embodiment of the arrangement of FIG. 4 which is particularly adaptable in applications wherein computer control panel space is not necessarily limited.

In FIG. 6 is shown another embodiment of the device of FIG. 4 which is particularly suited for applications wherein computer control panel space is not necessarily limited and therefore one neon indicator for each bit position of the displayed register 70 may be used. While in the following discussion the lengths of the displayed register and control register will be twenty-eight bits and seven bits respectively, as will hereinafter become obvious, in accordance with the present embodiment the registers may be of any length so long as the control register is a submultiple of the length of the displayed register. As is well known to those skilled in the art, this is not a particularly onerous requirement since usually in synchronous digital computers the various registers are either equal to, or are multiplies or submultiples of, each other.

In FIG. 6 the displayed register 70 is output from $X_{rd}$ along line 71 to a first group of three-term gates 72 through 78 to make up a first term thereof. The second terms 84 through 90 are the bit outputs of BPs7–1, respectively, of the control register 82. The third terms 94 through 100 of each of the gates 72 through 78 is a timing signal which is true during DTs1–7.

The first term of gate 79 is along line 71 from $X_{rd}$ of the displayed register 70 while the second term 91 of gate 79, as illustrated in FIG. 6, is from BP7 of the control register 82. As is obvious from a consideration of FIG. 6, gate 79 is a member of a second group of seven three-term gates, six of which, for the purposes of brevity, are not shown. Each gate in this second group of gates, in the same manner as gates 72 through 78, accepts the output of one bit position of the control register 82 as its second term. The third term 101 of each of the gates of the second group is a timing signal which is true during DTs8–14.

The first term of gates 80 and 81 is likewise from $X_{rd}$ of the displayed register 70 along line 71. Gates 80 and 81 are each members, respectively, of a third and fourth group of seven three-term gates, the other six gates in each group which, for the purposes of brevity, are not shown. Each gate of the third and fourth groups, in the same manner as gates 72 through 78 accepts the output of one bit position of the control register 82 as its second term. The third term of each gate in the third group of seven gates is a timing signal which is true DTs15–21 while the third term of each gate in the fourth group of gates is a timing signal which is true DTs22–28.

The output of each of the gates is furnished, as previously described in the description relating to FIG. 4, to an amplifier-pulse stretcher-neon amplifier combination (not shown) which is used to drive an associated neon indicator.

The operation of the device illustrated in FIG. 6 with respect to the outputting of the displayed register and control register is also as previously described with respect to FIG. 4, the only difference in the gating arrangement being that the gates are three-term gates and they can only pass a signal if the computer furnished timing signal making up their third term is true.

From a further consideration of FIG. 6, it can be seen that if, for instance, the output bit position ($X_{rd}$) of the displayed register 70 holds a one bit while the strobe bit is in BP7 of the control register 82, gates 72, 79, 80 and 81, will have two of their input terms true. As is further obvious, only one gate of the four gates 72, 79, 80, and 81 can pass a signal due to the inclusion of the third term which represents computer timing. In like manner it is possible for two terms of the four gates connected to BP6 of the control register 82 to be true at a given time with the result, however, that only the gate having its third term or timing true can pass a signal. The same holds true for the four gates connected to BP5 of the control register 82, for the four gates connected to BP4 of the control register 82; etc.

Thus it is readily apparent that only one gate of the twenty-eight gates which are used to monitor the contents of the twenty-eight bit displayed register 70 can be true at any given digit time since the first group of seven gates can pass a signal only during DTs1–7 due to the inclusion of the timing signal which is true only during DTs1–7. The second group of seven gates can pass a signal only during DTs8–14, the third group only during DTs15–21 and the fourth group only during DTs22–28. The seven bit control register 82 can be thus used to monitor the contents of the twenty-eight bit displayed register 70.

In summary, I have provided a device and method for monitoring the contents of a circulating register which is contained in a digital computer. The device utilizes a control register which is capable of parallel output to circulate a strobe bit. This strobe bit is gated timewise with the output of the register to be displayed, the various gates coming true only if a one bit is contained in the output portion of the register to be displayed at the particular digit time involved. The outputs of the various gates are amplified and stretched and used to drive associated neon indicators.

In the abovedescribed manner, I have provided a device for monitoring the contents of a circulating register contained in a digital computer which is not only novel and compact but which is, in addition, relatively inexpensive when compared with the devices presently utilized to monitor register contents. I have also provided a method of monitoring the contents of a circulating register contained in a digital computer which is novel and which is particularly useful in those machines wherein, as is the usual case, the computer operates in various states or modes and therefore normally has available during a state or mode a register which, if capable of parallel output, may be used as the hereindescribed control register.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A device for displaying the contents of a register which contents appear sequentially at the output portion thereof, comprising a register capable of parallel output from each bit position, said parallel output register's length being a submultiple in length of the length of the register to be displayed, a strobe bit circulating in said parallel output register, a plurality of three-term gates connected to said parallel output register whereby each of said bit positions of said parallel output register makes up a first term of each of said plurality of three-term gates, the output of said register to be displayed making up a second term of each of said plurality of three-term gates, computer timing means making up the third term of each of said plurality of three-term gates, and indicating means connected to the output of each of said gates.

2. A device for displaying the contents of a register which contents appear sequentially at the output portion thereof, comprising a register capable of parallel output from each of its bit positions, said parallel output register's length being a submultiple in length of the length of the register to be displayed, a strobe bit circulating in said parallel output register, a plurality of three-term gates, each of said bit positions of said parallel output register making up a first term of each of said plurality of three-term gates, the output of said register to be displayed making up a second term of each of said plurality of three-term gates, computer timing means making up the third term of each of said plurality of three-term gates, signal amplifying and shaping means connected to each of said gates, and indicating means connected to each of said signal amplifying and shaping means.

References Cited by the Examiner

UNITED STATES PATENTS

| | | | |
|---|---|---|---|
| 2,638,267 | 5/53 | Hartley | 235—164 |
| 2,672,283 | 3/54 | Havens | 235—164 |
| 2,848,709 | 8/58 | Jansky et al. | 340—347 |

OTHER REFERENCES

Pages 205 to 208 and 337 to 340, 1955, Arithmetic Operations in Digital Computers (Richards), D. Van Nostrand and Co.

MALCOLM A. MORRISON, *Primary Examiner.*

WALTER W. BURNS, JR., *Examiner.*